United States Patent
Tsunefuji

[19]

[11] Patent Number: 5,804,275

[45] Date of Patent: Sep. 8, 1998

[54] FIBER PRODUCT INCLUDING REFLECTIVE TREADS, AND REFLECTIVE IMPLEMENT PROVIDED BY USING SAID FIBER PRODUCT INCLUDING REFLECTIVE THREADS

[75] Inventor: Yoshihiko Tsunefuji, Tokyo, Japan

[73] Assignee: Tsunefuji & Co., Ltd., Tokyo, Japan

[21] Appl. No.: 507,987

[22] Filed: Jul. 27, 1995

Related U.S. Application Data

[62] Division of Ser. No. 338,876, Nov. 14, 1994, abandoned.

[30] Foreign Application Priority Data

Nov. 27, 1993 [JP] Japan ................................ 5-321280

[51] Int. Cl.$^6$ ........................................................ B32B 5/12
[52] U.S. Cl. ............................ 428/105; 428/113; 428/141; 428/156; 428/172; 428/357; 428/392; 428/400; 442/4; 442/46; 442/49
[58] Field of Search .................................... 428/357, 392, 428/397, 400, 105, 113, 141, 156, 172; 442/4, 46, 49

[56] References Cited

U.S. PATENT DOCUMENTS

| | | |
|---|---|---|
| 2,058,783 | 10/1936 | Franke . |
| 2,372,868 | 4/1945 | Warren, Jr. . |
| 2,963,850 | 12/1960 | Rosenblatt . |
| 4,397,142 | 8/1983 | Bingham . |
| 4,697,407 | 10/1987 | Wasserman . |
| 4,858,282 | 8/1989 | DuPont, Jr. . |

FOREIGN PATENT DOCUMENTS

| | | |
|---|---|---|
| 58-45001 | 10/1983 | Japan . |
| 62-13915 | 3/1987 | Japan . |
| 4-18143 | 1/1992 | Japan . |
| 6-184967 | 7/1994 | Japan . |

*Primary Examiner*—Richard Weisberger
*Attorney, Agent, or Firm*—Wenderoth, Lind & Ponack, L.L.P.

[57] ABSTRACT

The present invention relates to a fiber product having reflective threads, and a reflective implement provided by using the fiber product having reflective threads. The fiber product having reflective threads consists of flat threads and natural or synthetic fiber threads. Triangular pyramid-like or otherwise shaped micro-prisms are formed consecutively, and the incident light from the light source is reflected three times at the surfaces of each of the micro-prisms so that the reflected light is reflected back in a direction opposite to the direction of incidence. The fiber product is formed as a woven fabric or the like, and reflective implements provided by using the fiber product having reflective threads of this invention are formed with a woven fabric, woven fabric strip, Jacquard woven fabric, braided string, knitted string, twisted string, crosswise wound thread, crosswise wound string, knitted fabric or knitted lace consisting of the flat threads and natural fiber or chemical fiber threads. A walking stick cover for the blind is among the various implements which can be formed from the fiber product. Thus, novel fiber products and reflective implements which reflect the incident light from various light sources are made available.

14 Claims, 11 Drawing Sheets

F I G. 3(a)
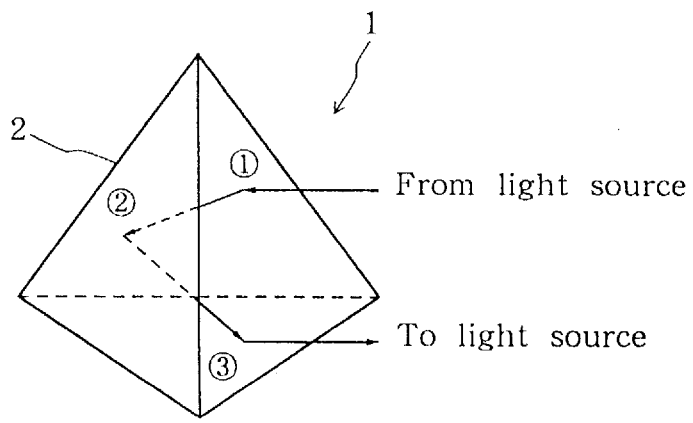
F I G. 3(b)
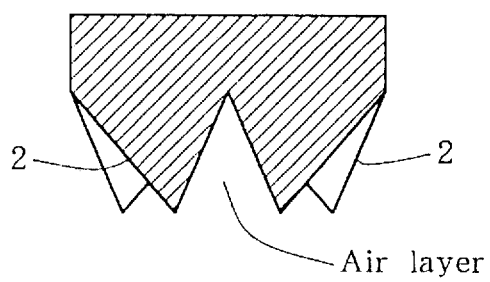
F I G. 4
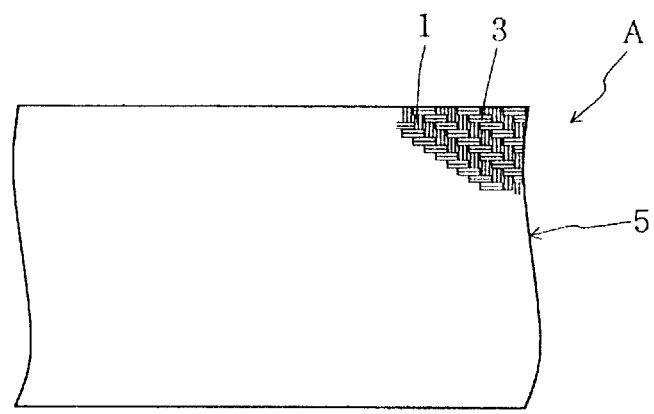

F I G . 5
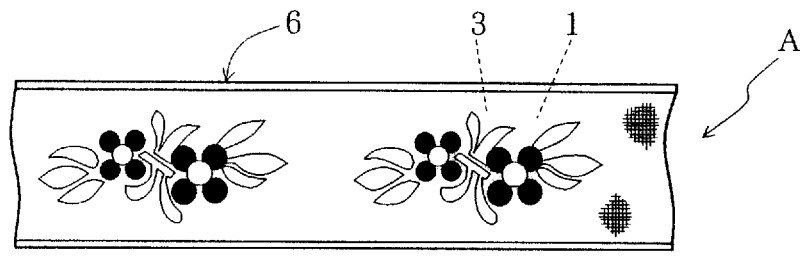
F I G . 6
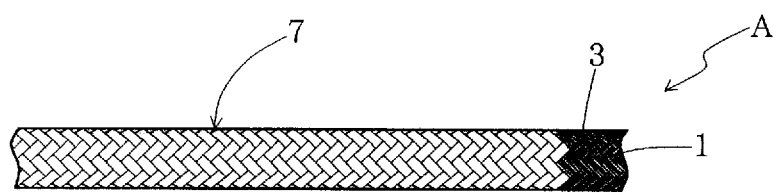
F I G . 7
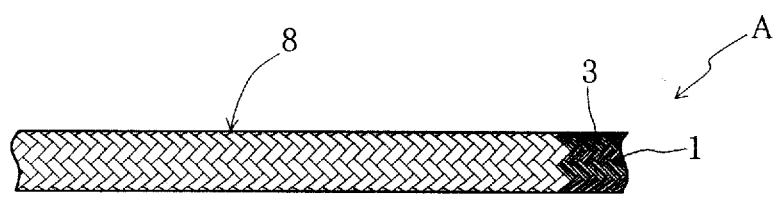
F I G . 8
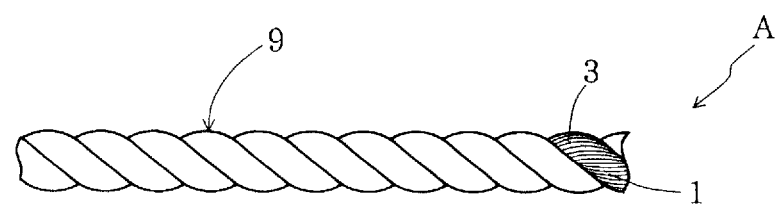

F I G. 30
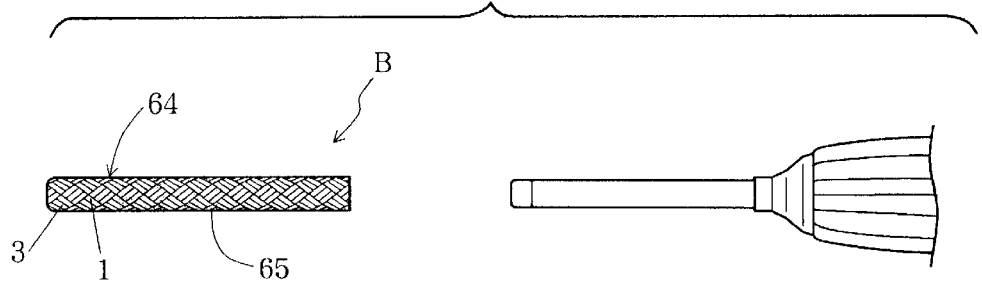

5,804,275

FIBER PRODUCT INCLUDING REFLECTIVE TREADS, AND REFLECTIVE IMPLEMENT PROVIDED BY USING SAID FIBER PRODUCT INCLUDING REFLECTIVE THREADS

This application is a divisional application of Ser. No. 08/338,876 filed Nov. 14, 1994, now abandoned.

BACKGROUND OF THE INVENTION

1. Field of the Invention

The present invention relates to a fiber product having reflective threads and a reflective implement provided by using the fiber product including reflective threads.

2. Prior Art

As conventional light returning reflective products, which reflect the light back to the source, sheet-like products in which triangular pyramid-like micro-prisms are formed consecutively and regularly in the material, such as polyester and vinyl chloride, and the incident light from the light source is reflected three times at the surfaces of the micro-prism so that the reflected light is reflected back to the direction of incidence are available. The micro-prism formed in the material, such as polyester and vinyl chloride, is so small that it cannot be visually identified without using a magnifier.

FIGS. 31 and 32 each give an enlarged illustration of a conventional sheet-like light returning reflective product 100.

With conventional sheet-like light returning reflective products, triangular pyramid-like micro-prisms 102 are formed consecutively and regularly in the material 101, such as polyester and vinyl chloride, as shown in FIG. 31.

Therefore, as shown in FIG. 32, the incident light from various light sources is reflected three times at the surfaces of a micro-prism 102, as illustrated with arrows and the succession indicators ①, ②, and ③, so that the reflected light is reflected back in a direction opposite to the direction of incidence.

In addition to the light returning reflective product as illustrated in FIGS. 31 and 32, a conventional reflective product (not illustrated) in which a number of irregular micro-beads are formed on the material so that the incident light is collectively reflected on the back of the micro-bead is available. However, comparison of the reflectivity of the light returning reflective product as illustrated in FIGS. 31 and 32 with that of the reflective product in which the incident light is intensively reflected on the back of micro-beads shows that the light returning reflective product as illustrated in FIGS. 31 and 32 has a reflectivity 3 to 4 times as high, resulting from the difference in reflectance between the reflective surfaces of both.

Conventional reflective products as illustrated in FIGS. 31 and 32 are widely used for a variety of applications in various sites such as a construction site at night and a traffic sign, with the sheet-like shape unchanged, or being cut in an appropriate shape to suit a particular application.

However, the above-mentioned conventional light returning reflective products are formed in a sheet-like shape. Therefore, they can be used only in the sheet-like state or a tape-like state, which results in the application being limited to a certain extent, although they can be widely used for a variety of applications.

SUMMARY OF THE INVENTION

Having been developed in consideration of the above-stated situation, this invention intends to solve these conventional problems, offering a variety of fiber products including woven fabrics in which threads in a flat state are used as the material, triangular pyramid-like micro-prisms are formed consecutively and regularly in the material, and with the flat thread itself, the incident light from the light source is reflected three times at the surfaces of said micro-prism so that the reflected light is reflected back in a direction opposite to the direction of incidence. The products are formed by using such configured flat threads and natural fiber threads or chemical fiber threads, and various reflective implements, such as clothes, are formed by using the fiber products.

The fiber product having reflective threads of this invention consists of flat threads in each of which triangular pyramid-like or otherwise shaped micro-prisms are formed consecutively, and the incident light from the light source is reflected three times at the surfaces of each of the micro-prisms so that the reflected light is reflected back to the direction of incidence, and natural fiber threads or chemical fiber threads, being formed as a woven fabric or the like. Reflective implements are provided by using the fiber product including reflective threads of this invention. Such implements are formed with woven fabric, narrow-width woven fabric, Jacquard woven fabric, braided string, knitted string, twisted string, crosswise wound thread, crosswise wound string, knitted fabric or knitted lace consisting of the flat threads, and natural fiber threads or chemical fiber threads. An example of an implement formed with fiber product is a walking stick cover for the blind. Thus, novel fiber products and reflective implements which reflect the incident light from various light sources are made available.

BRIEF DESCRIPTION OF THE DRAWINGS

FIG. 3(a) is an enlarged illustration of a micro-prism which is formed in the flat thread as shown in FIG. 2, and FIG. 3(b) is a central vertical section of the apex portion of each micro-prism formed in the flat thread as shown in FIG. 2.

FIG. 4 is an enlarged plan view of an extracted part of a narrow-width woven fabric formed from a fiber product having reflective threads according to this invention.

FIG. 5 is an enlarged plan view of an extracted part of a Jacquard woven fabric formed from a fiber product having reflective threads according to this invention.

FIG. 6 is an enlarged plan view of an extracted part of a braided string formed from a fiber product having reflective threads according to this invention.

FIG. 7 is an enlarged plan view of an extracted part of a knitted string formed from a fiber product having reflective threads according to this invention.

FIG. 8 is an enlarged plan view of an extracted part of a twisted string formed from a fiber product having reflective threads according to this invention.

FIG. 30 is a plan view of an umbrella ferrule cap configured from a reflective implement provided by using a fiber product having reflective threads according to this invention.

DETAILED DESCRIPTION OF THE INVENTION

Figure 1:
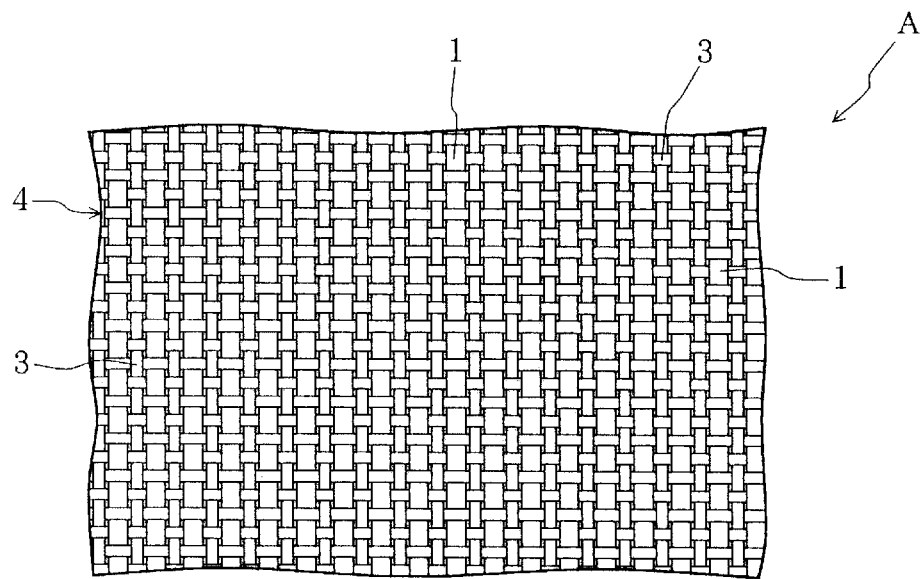
FIG. 1 is an enlarged plan view of an extracted part of a woven fabric which is formed from a fiber product having reflective threads according to this invention.

A fiber product having reflective threads consists of flat threads and either natural fiber threads or chemical (i.e. synthetic) fiber threads. Triangular pyramid-like or otherwise shaped micro-prisms are formed consecutively in each of the flat threads, and the incident light from the light source is reflected three times at the surfaces of the micro-prism so that the reflected light is reflected back in a direction opposite to the direction of incidence.

The fiber product can be formed of flat fibers made of 100% polyester material.

The fiber product can be formed as a fabric woven so that the flat threads used as warps and fillers are placed at regular intervals in the woven fabric consisting of natural fiber threads or chemical fiber threads. The fiber product can be formed as a narrow-width fabric woven so that the flat threads used as warps and fillers are placed at regular intervals in the narrow-width woven fabric consisting of natural fiber threads or chemical fiber threads. The fiber product can be formed as a Jacquard fabric woven so that the flat threads used as warps and fillers are placed at regular intervals in the Jacquard woven fabric consisting of natural fiber threads or chemical fiber threads.

The fiber product can be formed as a braided string consisting of the flat threads and either natural fiber threads or chemical fiber threads. The fiber product can be formed as a knitted string consisting of the flat threads and either natural fiber threads or chemical fiber threads. The fiber product can be formed as a twisted string consisting of the flats threads and either natural fiber threads or chemical fiber threads.

The fiber product can be formed as a crosswise wound thread consisting of the flat threads and either natural fiber threads or chemical fiber threads. The fiber product can be formed as a crosswise wound string consisting of the flat threads and either natural fiber threads or chemical fiber threads.

The fiber product can be formed as a knitted fabric consisting of the flat threads and either natural fiber threads or chemical fiber threads. The fiber product can be formed as a knitted lace consisting of the flat threads and either natural fiber threads or chemical fiber threads.

A reflective implement provided by using a fiber product having reflective threads can be formed from a woven fabric, a narrow-width woven fabric, a Jacquard woven fabric, a braided string, a knitted string, a twisted string, a crosswise wound thread, a crosswise wound string, a knitted fabric or a knitted lace consisting of flat threads and either natural fiber threads or chemical fiber threads, wherein triangular pyramid-like or otherwise shaped micro-prisms are formed consecutively, and the incident light from the light source is reflected at the surfaces of the micro-prism so that the reflected light is reflected back in a direction opposite to the direction of incidence.

The reflective implement can be such that the flat fibers thereof are 100% polyester material.

The reflective implement can be configured as a walking stick cover for the blind by forming a braided string consisting of the flat threads and either natural fiber threads or chemical fiber threads into a cylinder or by forming a knitted fabric into a hose-like, small-diameter cylinder so that a walking stick can be inserted into the cylinder.

The reflective implement can be configured as a rope for use at night in a place such as a construction site by forming a braided string, a knitted string, a twisted string or a crosswise wound string consisting of the flat threads and either natural fiber threads or chemical fiber threads into a long, small-diameter rope and loading the rope in a small-diameter tube formed from a clear plastic or other material.

The reflective implement can be configured as a forming implement for use in a variety of bags by forming a braided string, a knitted string, a twisted string, a crosswise wound thread, a crosswise wound string or a knitted fabric consisting of the flat threads and either natural fiber threads or chemical fiber threads into a small-diameter string or a thread so that the small-diameter string or the thread can be sutured in the sewing margin located along the contour line in a variety of bags.

The reflective implement can be configured as a fastener loading tape by forming a woven fabric or a narrow-width woven fabric consisting of the flat threads and either natural fiber threads or chemical fiber threads into a narrow-width tape so that a fastener can be loaded on the tapes.

The reflective implement can be configured as an implement for wrapping a ring buoy by forming a woven fabric, a Jacquard woven fabric, a knitted fabric or a knitted lace consisting of the flat threads and either natural fiber threads or chemical fiber threads and provided with a coating into an annular bag so that the bag can wrap a ring buoy to be used on the water.

The reflective implement can be configured as a life jacket by forming it with a woven fabric, a Jacquard woven fabric, a knitted fabric or a knitted lace consisting of the flat threads and natural fiber threads or chemical fiber threads and provided with a coating.

The reflective implement can be configured as a rain coat by forming it with a woven fabric or a Jacquard woven fabric consisting of the flat threads and either natural fiber threads or chemical fiber threads and provided with a coating.

The reflective implement can be configured as sports wear and other various types of suits of clothes by forming it with a woven fabric, a Jacquard woven fabric, a knitted fabric or a knitted lace consisting of the flat threads and either natural fiber threads or chemical fiber threads.

The reflective implement can be configured as an arm band by forming it with a woven fabric, a Jacquard woven fabric, a knitted fabric or a knitted lace consisting of the flat threads and either natural fiber threads or chemical fiber threads.

The reflective implement can be configured as a hair band or a wrist band by forming it with a woven fabric, a Jacquard woven fabric, a knitted fabric or a knitted lace consisting of the flat threads and either natural fiber threads or chemical fiber threads and incorporating a stretchable material such as rubber.

With each of the fiber products having reflective threads, the numerous micro-prisms formed in the flat threads constituting a part of the fiber product allow the realization of novel fiber products in which the flat thread members reflect the incident light from various light sources.

With each of the woven fabric, the narrow-width woven fabric, the Jacquard woven fabric, the braided string, the knitted string, the twisted string, the crosswise would thread, the crosswise wound string, the knitted fabric and the knitted lace, the numerous micro-prisms formed in the flat threads constituting a part of the woven fabric, the narrow-width woven fabric, the Jacquard woven fabric, the braided string, the knitted string, the twisted string, the crosswise wound thread, the crosswise wound string, the knitted fabric and the knitted lace, respectively, allow the realization of a novel fiber product in which the flat threads in the woven fabric, the narrow-width woven fabric, the Jacquard woven fabric, the braided string, the knitted string, the twisted string, the crosswise wound thread, the crosswise wound string, the knitted fabric and the knitted lace reflect the incident light from various light sources.

With each of the walking stick cover for the blind, the pet rope, the rope for use at night in a place such as a construction site, the implement for hanging a pair of spectacles, the pair of spectacles, the forming implement for use in a variety of bags, the fastener loading tape, the button wrapping implement, the cap forming implement, the amulet case, the cover for traffic safety sign carrier, the implement for wrapping a fishing float, the implement for wrapping a ring buoy, the life jacket, the rain coat, the suit of clothes, the arm band, the hair band, the wrist band, and the umbrella ferrule cap, the numerous micro-prisms formed in the flat threads constituting a part of the walking stick cover for the blind, the pet rope, the rope for use at night in such a place as a construction site, the implement for hanging a pair of spectacles, the pair of spectacles, the forming implement for use in a variety of bags, the fastener loading tape, the button wrapping implement, the cap forming implement, the amulet case, the cover for traffic safety sign carrier, the implement for wrapping a fishing float, the implement for wrapping a ring buoy, the life jacket, the rain coat, the suit of clothes, the arm band, the hair band, the wrist band, and the umbrella ferrule cap, respectively, allow the realization of a novel reflective product in which the flat threads in the walking stick cover for the blind, the pet rope, the rope for use at night in such a place as a construction site, the implement for hanging a pair of spectacles, the pair of spectacles, the forming implement for use in a variety of bags, the fastener loading tape, the button wrapping implement, the cap forming implement, the amulet case, the cover for traffic safety sign carrier, the implement for wrapping a fishing float, the implement for wrapping a ring buoy, the life jacket, the rain coat, the suit of clothes, the arm band, the hair band, the wrist band, and the umbrella ferrule cap reflect the incident light from various sources.

By referring to the attached drawings, the preferred embodiments of the fiber products having reflective threads according to this invention and the reflective implements provided by using the fiber products including reflective threads according to this invention will now be described in detail.

First, the preferred embodiments of a fiber product A including reflective threads related to this invention will be described.

Figure 2:
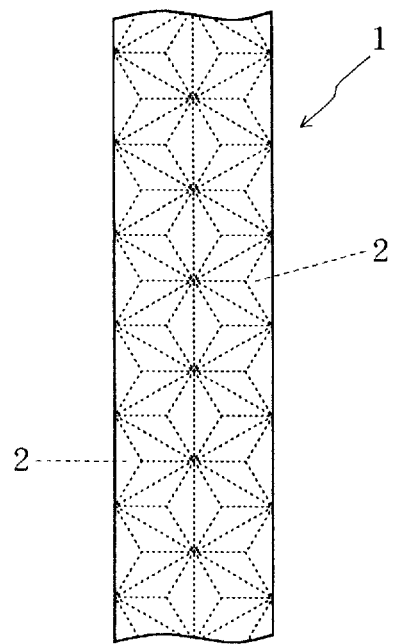
FIG. 2 is an enlarged drawing of an extracted part of a flat thread which constitutes a part of the woven fabric shown in FIG. 1.

FIG. 1 is an enlarged plan view of an extracted part of a fiber product A including reflective threads according to this invention; FIG. 2 an enlarged drawing of an extracted part of a flat thread 1 to be described later; and FIG. 3(a) is an enlarged illustration of a micro-prism 2 formed in the flat thread 1, to be described later.

This fiber product A including reflective threads consists of flat threads 1, which are in a flat state and are made of 100% polyester or other material, and threads 3, which are composed of natural fibers or chemical (i.e. synthetic) fibers. In either of the surfaces of the flat thread 1, triangular pyramid-like or otherwise shaped micro-prisms 2 are formed consecutively and regularly, and with the flat thread 1 itself, the incident light from the light source is reflected three times at the surfaces of the micro-prism 2 so that the reflected light is reflected back in a direction opposite to the direction of incidence, as illustrated in FIG. 3 with arrows and the succession indicators, ①, ②, and ③.

FIG. 3(b) is a central vertical section of the apex portion of each micro-prism 2 formed in the flat thread 1 shown in FIG. 2, and the flat surface as shown in the same figure serves as a reflective surface, being located at the front surface of the flat thread 1. The inside of the triangular pyramid-like or otherwise shaped micro-prism 2 provides an air layer.

With this invention, the material of the flat thread 1 is not limited to polyester, and it is possible to use any other material, such as polyvinyl chloride and acrylic plastics, in which triangular pyramid-like or otherwise shaped micro-prisms 2 can be formed consecutively and regularly. In addition, with this invention, the micro-prism 2 may be formed in a shape such as a hexagonal pyramid.

With the preferred embodiment as shown in FIG. 1, the fiber product A is formed as a woven fabric 4 in which the natural fiber or chemical fiber threads 3 are woven with the flat threads 1 used as warps and placed at regular intervals. The flat threads 1 may, of course, be used as fillers and placed at regular intervals, or be used in a pattern area in which an appropriate figure or other is formed, in the woven fabric 4 comprising the natural fiber or chemical fiber threads 3.

With the woven fabric 4 thus formed, the flat threads 1 that constitute a part of this woven fabric 4 reflect the incident light from various light sources as illustrated in FIG. 3.

The fiber product A having reflective threads may be formed as a narrow-width woven fabric (i.e. a woven fabric strip) 5 as shown in FIG. 4.

In addition, the fiber product A may be formed as a woven fabric which is produced while a woven figure or other is created by combining warps with fillers, that is to say, a Jacquard woven fabric 6 as shown in FIG. 5.

With the preferred embodiment as shown in FIG. 6, the fiber product A is formed as a braided string 7, and the flat threads 1 are used amongst the natural fiber or chemical fiber threads 3 to form the braided string 7. The braided string 7 is produced in the shape of a string by braiding the natural fiber or chemical fiber threads 3 and the flat threads 1 in an intermixed (or interengaged) state.

With the preferred embodiment as shown in FIG. 7, the fiber product A is formed as a knitted string 8, and the flat threads 1 are used amongst the natural fiber or chemical fiber threads 3 to form the knitted string 8. The knitted string 8 is produced in the shape of a string by knitting the natural fiber or chemical fiber threads 3 and the flat threads 1 in an intermixed state.

With the preferred embodiment as shown in FIG. 8, the fiber product A is formed as a twisted string 9, and the flat threads 1 are used amongst the natural fiber or chemical fiber threads 3 to form the twisted string 9. The twisted string 9 is produced in the shape of a string by twisting the natural fiber or chemical fiber threads 3 and the flat threads 1 in an intermixed state.

Figure 9:
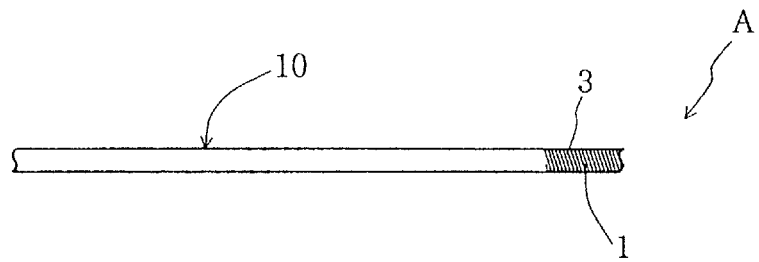
FIG. 9 is an enlarged plan view of an extracted part of a crosswise wound thread formed from a fiber product having reflective threads according to this invention.

With the preferred embodiment as shown in FIG. 9, the fiber product A is formed as a crosswise wound thread 10, and the flat threads 1 are used amongst the natural fiber or chemical fiber threads 3 to form the crosswise wound thread 10. The crosswise wound thread 10 is produced in the shape of small-diameter thread by crosswise winding the natural fiber or chemical fiber threads 3 and the flat threads 1 in an intermixed state. This crosswise wound thread 10 is coiled crosswise on an appropriate core, for example, an extremely small-diameter rubber core to be used in the top portion of a sock for binding the sock to the ankle, so that the core is fully wrapped by the thread 10.

Figure 10:
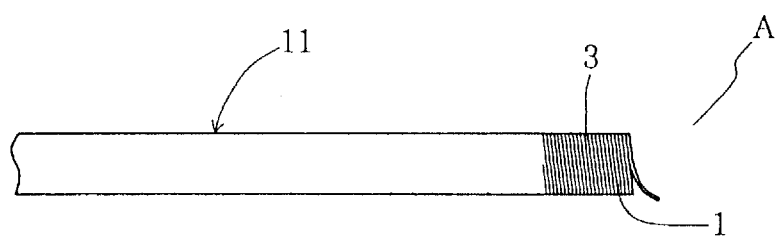
FIG. 10 is an enlarged plan view of an extracted part of a crosswise wound string formed from a fiber product having reflective threads according to this invention.

With the preferred embodiment as shown in FIG. 10, the fiber product A is formed as a crosswise wound string 11, and the flat threads 1 are used amongst the natural fiber or chemical fiber threads 3 to form the crosswise wound string 11. The crosswise wound string 11 is produced in the shape of a small-diameter string by crosswise winding the natural fiber or chemical fiber threads 3 and the flat threads 1 in an intermixed state. This crosswise wound string 11 is coiled crosswise on an appropriate core, such as a string or the like, so that the core is fully wrapped by the threads 1, 3.

Figure 11:
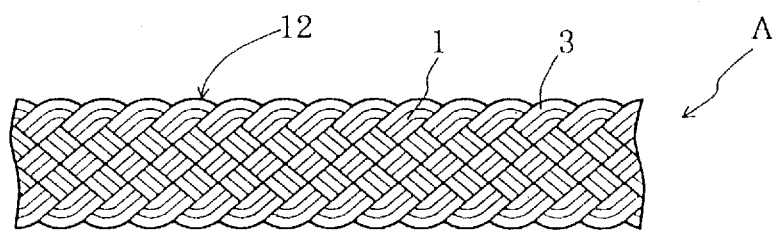
FIG. 11 is an enlarged plan view of an extracted part of a knitted fabric formed from a fiber product having reflective threads according to this invention.

With the preferred embodiment as shown in FIG. 11, the fiber product A is formed as a knitted fabric 12, and the flat threads 1 are used amongst the natural fiber or chemical fiber threads 3 to form the knitted fabric 12. The knitted fabric 12 is produced in the shape of a fabric by knitting the natural fiber or chemical fiber threads 3 and the flat threads 1 in an intermixed state.

Figure 12:
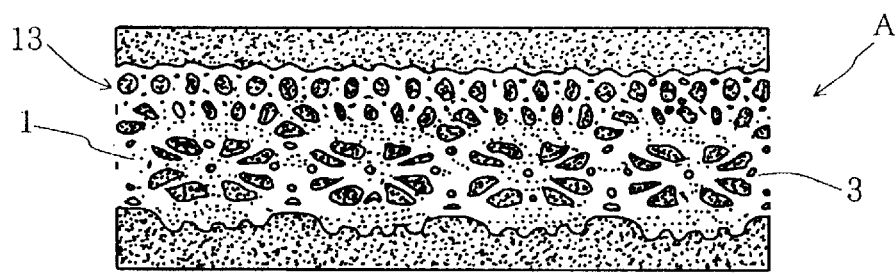
FIG. 12 is an enlarged plan view of an extracted part of a knitted lace formed from a fiber product having reflective threads according to this invention.

With the preferred embodiment as shown in FIG. 12, the fiber product A is formed as a knitted lace 13, and the flat threads 1 are used amongst the natural fiber or chemical fiber threads 3 to form the knitted lace 13. The knitted lace 13 is produced in the shape of lace by knitting the natural fiber or chemical fiber threads 3 and the flat threads 1 in an intermixed state.

With the braided string 7, the knitted string 8, the twisted string 9, the crosswise wound thread 10, the crosswise wound string 11, the knitted fabric 12 and the knitted lace 13 in the respective preferred embodiments as shown in FIGS. 6 to 12, the flat threads 1 that constitute a part of the braided string 7, the knitted string 8, the twisted string 9, the crosswise wound thread 10, the crosswise wound string 11, the knitted fabric 12 or the knitted lace 13, reflect the incident light from various light sources as illustrated in FIG. 3.

Secondly, the preferred embodiments of a reflective implement B provided by using the fiber product A having reflective threads according to this invention will now be described.

Figure 13:
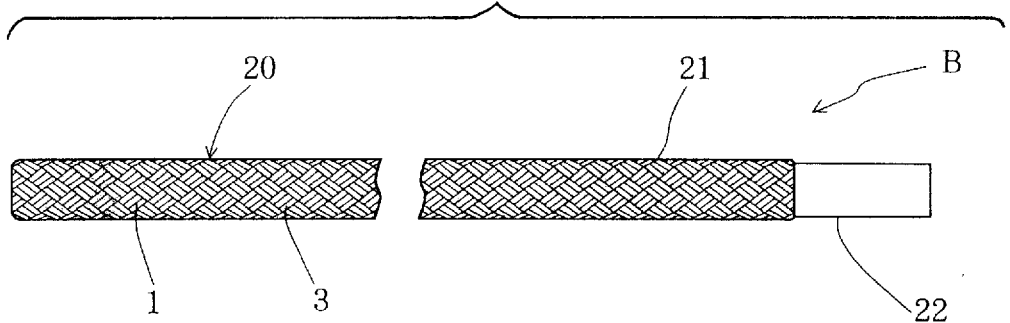
FIG. 13 is a partially cut out plan view of a walking stick cover for the blind configured from a reflective implement provided by using a fiber product having reflective threads according to this invention.

FIG. 13 is a partially cut out plan view of a walking stick cover 20 for the blind configured from a reflective implement B provided by using the fiber product A having reflective threads according to this invention.

With this walking stick cover 20 for the blind, the knitted fabric 12, which is formed with the natural or chemical fiber threads 3 and the flat threads 1, is used to form a hose-like small-diameter cylinder 21 so that a walking stick 22 can be inserted into the cylinder 21. The fiber product A having reflective threads and forming the cylinder 21 is not limited to the knitted fabric 12. Rather, the woven fabric 4, the narrow-width woven fabric 5, the Jacquard woven fabric 6 or the knitted lace 13 may be used instead. In addition, for this walking stick cover 20 for the blind, the cylinder 21 may be configured by forming the braided string 7 formed with the natural fiber or chemical fiber threads 3 and the flat threads 1 into a cylinder.

With the walking stick cover 20 for the blind thus formed, the flat threads 1 that constitute a part of this walking stick cover 20 for the blind reflect the incident light from various light sources as illustrated in FIG. 3. Therefore, when the walking stick cover 20 for the blind is used at night, it can provide more safety for the user.

Figure 14:
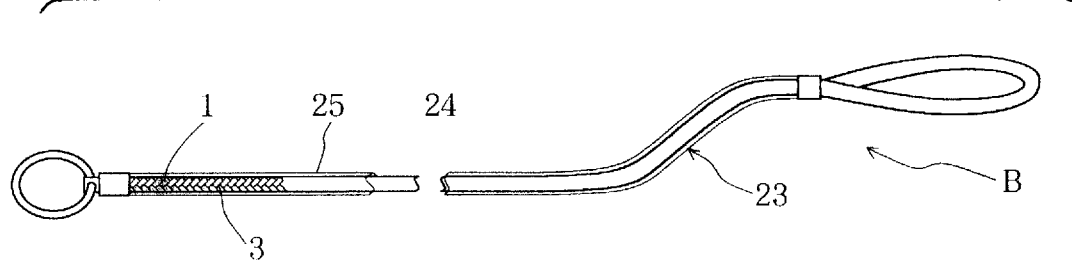
FIG. 14 is a partially cut out bird's eye view of a pet rope configured from a reflective implement provided by using a fiber product having reflective threads according to this invention.

FIG. 14 is a partially cut out bird's eye view of a pet rope (or leash) 23 which is formed from a reflective implement B provided by using the fiber product A having reflective threads according to this invention.

With this pet rope 23, the braided string 7, the knitted string 8, the twisted string 9 or the crosswise wound string 11, which is formed with natural fiber or chemical fiber threads 3 and the flat threads 1, is used to form a small-diameter string 24, and the small-diameter string 24 is loaded in a small-diameter tube 25 formed from a clear plastic or other material.

With the pet rope 23 thus formed, the flat threads 1 that constitute a part of this pet rope 23 reflect the incident light from various light sources, and therefore, when this pet rope 23 is used at night for a walk or the like with a pet, it can provide more safety for the user and the pet.

Figure 15:
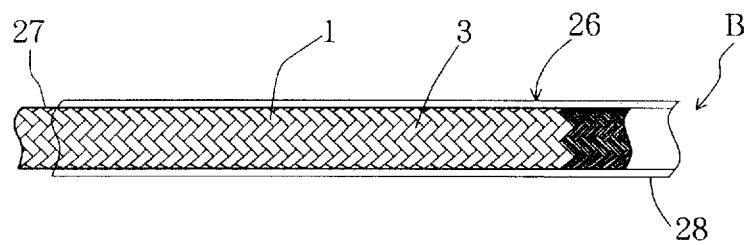
FIG. 15 is a partially cut out bird's eye view of a rope for use at night in a place such as a construction site configured from a reflective implement provided by using a fiber product having reflective threads according to this invention.

FIG. 15 is a partially cut out bird's eye view of a rope for use at night in a place such as a construction site 26 and that is formed from a reflective implement B provided by using the fiber product A having reflective threads according to this invention.

With this rope 26, the braided string 7, the knitted string 8, the twisted string 9 or the crosswise wound string 11, which is formed with natural fiber or chemical fiber threads 3 and the flat threads 1, is used to form a long, small-diameter rope 27, and the rope 27 is loaded in a small-diameter tube 28 formed from a clear plastic or other material.

With the rope 26 thus formed, the flat threads 1 that constitute a part of this rope 26 reflect the incident light from various light sources, and therefore, when this rope 26 is used at night in a place such as a construction site, it can provide more benefits for traffic safety and the like.

Figure 16A:
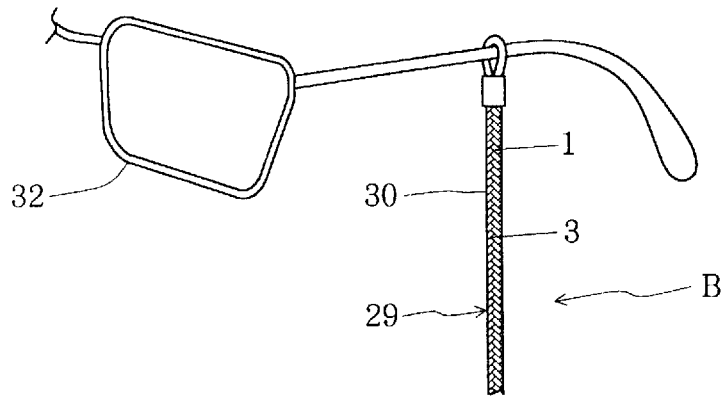
FIGS. 16(a) and 16(b) are bird's eye views of an implement for hanging a pair of spectacles configured from a reflective implement provided by using a fiber product having reflective threads according to this invention.
Figure 16B:
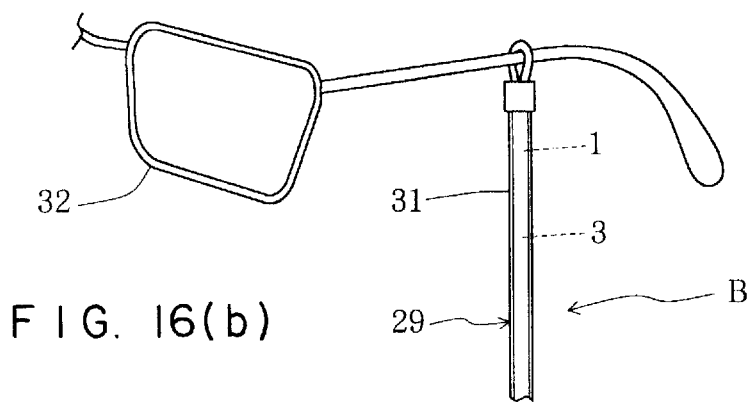

FIG. 16 is a partially cut out bird's eye view of an implement 29 for hanging a pair of spectacles that is formed from a reflective implement B provided by using the fiber product A having reflective threads according to this invention.

With this implement 29 for hanging a pair of spectacles, the narrow-width woven fabric 5, the braided string 7, the knitted string 8, the twisted string 9 or the crosswise wound string 11, which is formed with natural fiber or chemical fiber threads 3 and the flat threads 1, is used to form a small-diameter string 30 or a narrow-width tape 31 so that both ends of the string 30 or the tape 31 can be connected to both ends of the frame of a pair of spectacles 32, respectively, to prevent the pair of spectacles 32 from being dropped by causing the pair of spectacles 32 to be hung from the neck when the pair of spectacles 32 is taken off. As the fiber product A having reflective threads that forms the string 30 or the tape 31, the woven fabric 4, the Jacquard woven fabric 6, the knitted fabric 12 or the knitted lace 13 may be used.

With the implement 29 for hanging a pair of spectacles thus formed, the flat threads 1 that constitute a part of this implement 29 for hanging a pair of spectacles reflect the incident light from various light sources, and therefore, the pair of spectacles 32 can be visually identified quickly when they have been taken off at night.

Figure 17:
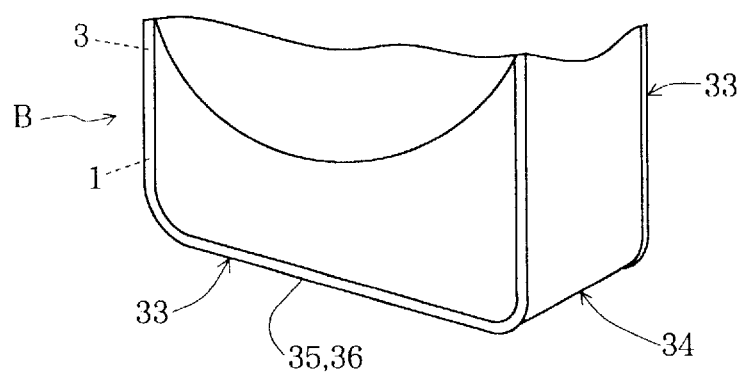
FIG. 17 is a partially cut out bird's eye view of a forming implement for use in a variety of bags configured from a reflective implement provided by using a fiber product having reflective threads according to this invention.

FIG. 17 is a partially cut out bird's eye view of a bag 34 which is formed by using a forming implement 33 for use in a variety of bags and that is configured from a reflective implement B provided by using the fiber product A having reflective threads according to this invention.

With the forming implement 33, the braided string 7, the knitted string 8, the twisted string 9, the crosswise wound thread 10, the crosswise wound string 11 or the knitted fabric 12, which is formed with the natural fiber or chemical fiber threads 3 and the flat threads 1, is used to form a small-diameter string 35 or a thread 36 so that the small-diameter string 35 or the thread 36 can be sutured in or bonded to the sewing margin located along the contour line in a variety of bags. The small-diameter string 35 or the thread 36 may be wrapped with a clear, thin plastic material or the like, or provided with a coating.

With this forming implement 33, the flat threads 1 that constitute a part of the forming implement 33 and are located in the sewing margin located along the contour line in the bag 34 or elsewhere, reflect the incident light from various light sources, and therefore, unique and novel bags which reflect light at night can be realized.

Figure 18:
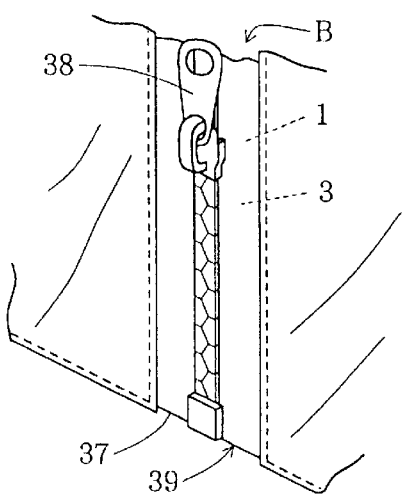
FIG. 18 is a bird's eye view of a fastener loading tape configured from a reflective implement provided by using a fiber product having reflective threads according to this invention.

FIG. 18 is a partially cut out bird's eye view of a fastener 38 which is formed by using a fastener loading tape 37 that is configured from a reflective implement B provided by using the fiber product A including reflective threads related to this invention.

With the fastener loading tape 37, the woven fabric 4 or the narrow-width woven fabric 5, which is formed with the natural fiber or chemical fiber threads 3 and the flat threads 1, is used to form a narrow-width tape 39 so that the fastener 38 can be loaded on the tapes 39.

With this fastener loading tape 37, the flat threads 1 that constitute a part of the fastener loading tape 37, of the tapes 39 located on both sides of the fastener 38, reflect the incident light from various light sources, and therefore, a unique and novel fastener 38 which reflects light at night can be realized.

Figure 19:
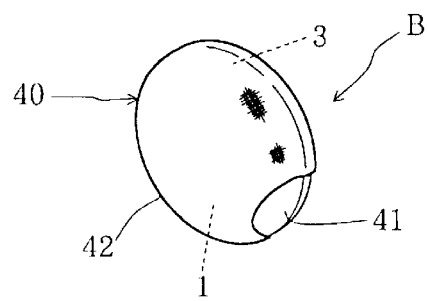
FIG. 19 is a bird's eye view of a button wrapping implement configured from a reflective implement provided by using a fiber product having reflective threads according to this invention.

FIG. 19 is a partially cut out bird's eye view of a button wrapping implement 40 which is configured from a reflective implement B provided by using the fiber product A having reflective threads according to this invention, and is used for a button 41.

With the button wrapping implement 40, the woven fabric 4, the narrow-width woven fabric 5, the Jacquard woven fabric 6, the knitted fabric 12 or the knitted lace 13, which is formed with the natural fiber or chemical fiber threads 3 and the flat threads 1, is used to form a small piece 42 of an appropriate size so that the small piece 42 can be used to wrap a variety of buttons 41 in clothes.

With this button wrapping implement 40, the flat threads 1 that constitute a part of the small piece 42 reflect the incident light from various light sources, and therefore, a variety of unique and novel buttons 41 for use with clothes and which reflect light at night can be realized.

Figure 20A:
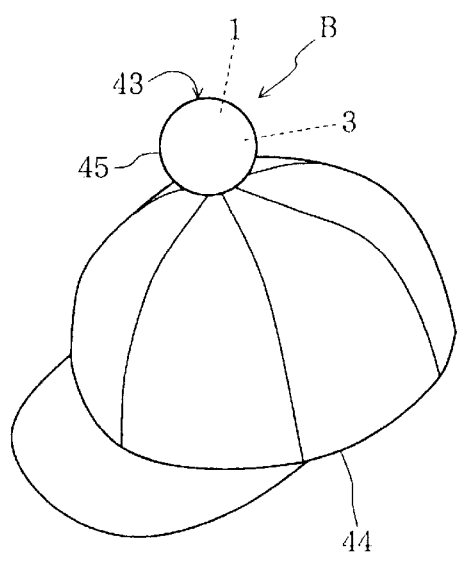
FIGS. 20(a) and 20(b) are bird's eye views of a cap forming implement configured from a reflective implement provided by using a fiber product having reflective threads according to this invention.
Figure 20B:
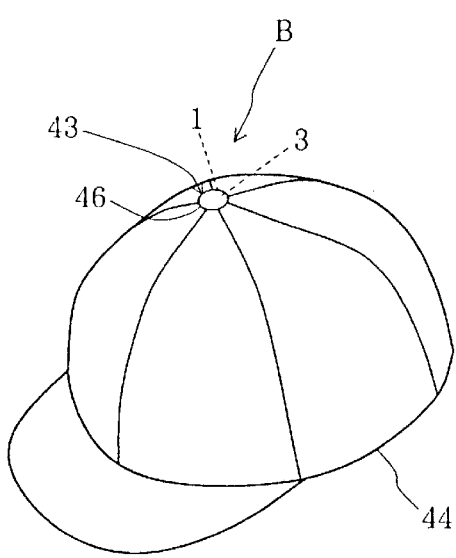

FIGS. 20(a) and 20(b) are bird's eye views of a cap 44 which is formed by using a cap implement 43 that is configured from a reflective implement B provided by using the fiber product A having reflective threads according to this invention.

With the cap implement 43, the braided string 7, the knitted string 8, the twisted string 9, the crosswise wound string 11, the knitted fabric 12 or the knitted lace 13, which is formed with the natural fiber or chemical fiber threads 3 and the flat threads 1, is used to form a small sphere 45 or a small disk 46 so that the small sphere 45 or the small disk 46 can be used on the top of a cap 44.

With this cap implement 43, said flat threads 1 that constitute a part of the small sphere 45 or said small disk 46 reflect the incident light from various light sources, and therefore, a variety of unique and novel caps 44 which reflect light at night can be realized.

Figure 21:
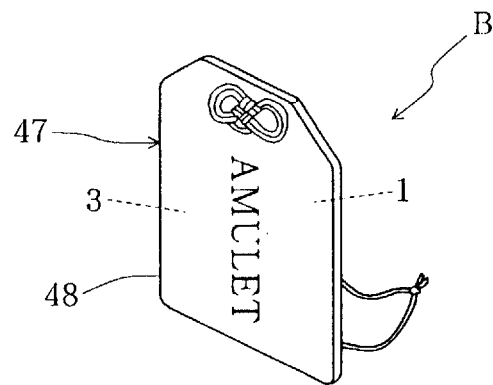
FIG. 21 is a bird's eye view of an amulet case configured from a reflective implement provided by using a fiber product having reflective threads according to this invention.

FIG. 21 is a bird's eye view of an amulet case 47 that is configured from a reflective implement B provided by using the fiber product A having reflective threads according to this invention.

With the amulet case 47, the woven fabric 4, the narrow-width woven fabric 5, the Jacquard woven fabric 6, the knitted fabric 12 or the knitted lace 13, which is formed with the natural fiber or chemical fiber threads 3 and the flat threads 1, is used to form a small-sized case 48 so that the case 48 can accommodate a traffic safety amulet or other various types of amulets.

With this amulet case 47, the flat threads 1 that constitute a part of the case 48 reflect the incident light from various light sources, and therefore, a unique and novel case which reflects light at night can be realized.

Figure 22A:
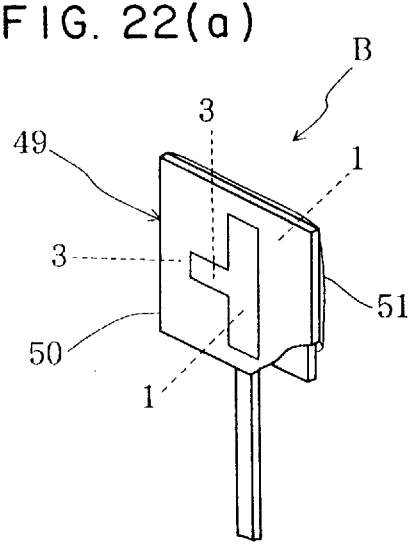
FIGS. 22(a) and 22(b) are bird's eye views of a cover for traffic safety sign carrier configured from a reflective implement provided by using a fiber product having reflective threads according to this invention.
Figure 22B:
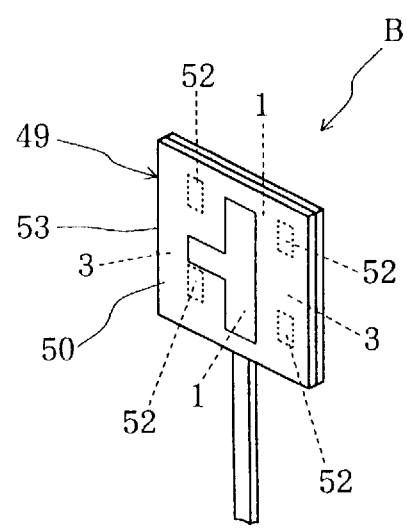

FIGS. 22 (a) and (b) are bird's eye views of covers 49 for a traffic safety sign and configured from a reflective implement B provided by using the fiber product A having reflective threads according to this invention.

With the covers 49 for the traffic safety sign carrier the woven fabric 4 or the knitted fabric 12, which is formed with the natural fiber or chemical fiber threads 3 and the flat threads 1 and is provided with a coating, is used to form a bag 51 or a sheet 53 having an application surface 52 at the back, equipped with a portion for traffic safety indication figures, characters, digits and the like, so that the bag 51 can wrap about a traffic safety sign carrier or the sheet 53 can be applied to it.

The cover 49 for traffic safety sign carrier thus configured can easily be loaded on a traffic safety sign carrier, and the flat threads 1 that constitute a part of the cover 49 reflect the incident light from various light sources. Therefore, with the cover 49, more traffic safety can be provided at night.

Figure 23:
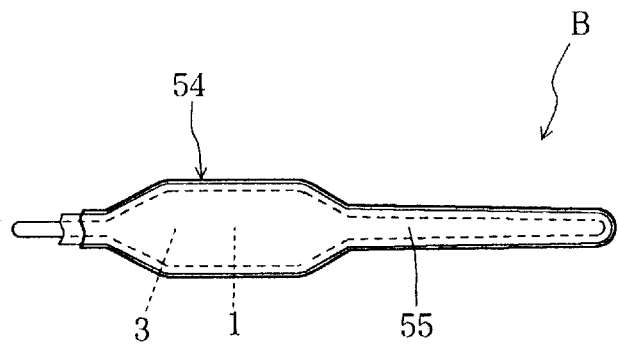
FIG. 23 is a plan view of an implement for wrapping a fishing float configured from a reflective implement provided by using a fiber product having reflective threads according to this invention.

FIG. 23 is a partially cut out plan view of an implement 54 for wrapping a fishing float that is configured from a reflective implement B provided by using the fiber product A having reflective threads according to this invention.

With the implement 54 for wrapping a fishing float, the woven fabric 4 or the narrow-width woven fabric 5, which is formed with the natural fiber or chemical fiber threads 3 and the flat threads 1 and is provided with a coating, is used to form a small-sized wrapper 55 so that the wrapper 55 can wrap about a fishing float.

With this implement 54 the flat threads 1 that constitute a part of the wrapper 55 reflect the incident light from various light sources, and therefore, a unique and novel fishing float which reflects light at night can be realized.

Figure 24:
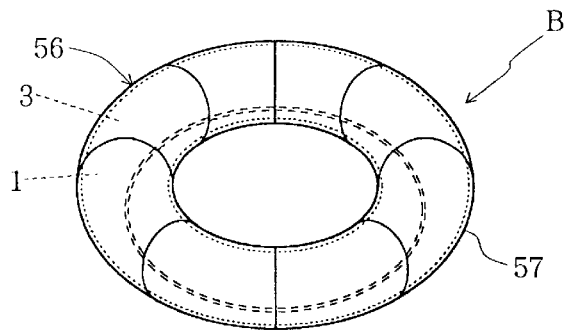
FIG. 24 is a bird's eye view of an implement for wrapping a ring buoy configured from a reflective implement provided by using a fiber product having reflective threads according to this invention.

FIG. 24 is a bird's eye view of an implement 56 for wrapping a ring buoy wrapping and that is configured from a reflective implement B provided by using the fiber product A having reflective threads according to this invention.

With the implement 56, the woven fabric 4, the Jacquard woven fabric 6, the knitted fabric 12 or the knitted lace 13, which is formed with the natural fiber or chemical fiber threads 3 and the flat threads 1 and is provided with a coating, is used to form an annular bag 57 so that the bag 57 can wrap around a ring buoy to be used on the water.

The implement 56 thus configured can easily be loaded on a ring buoy, and the flat threads 1 that constitute a part of the ring buoy wrapper 56 reflect the incident light from various light sources, and therefore, with the ring buoy wrapper 56, lifesaving operations at night can be quickly made, and more safety on the sea can be provided.

Figure 25:
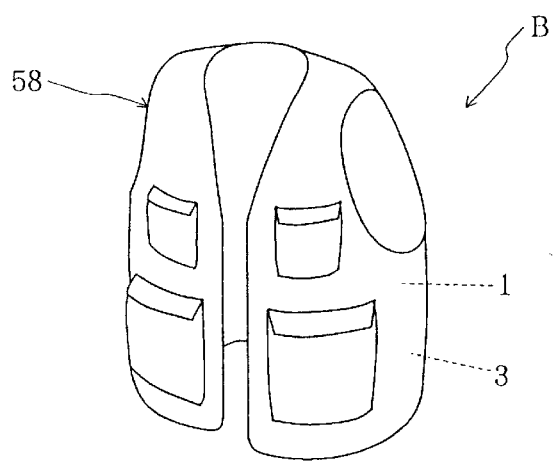
FIG. 25 is a bird's eye view of a life jacket configured from a reflective implement provided by using a fiber product having reflective threads according to this invention.

FIG. 25 is a bird's eye view of a life jacket 58 to be used in an emergency and that is configured from a reflective implement B provided by using the fiber product A having reflective threads according to this invention.

This life jacket 58 is formed with the woven fabric 4, the Jacquard woven fabric 6, the knitted fabric 12 or the knitted lace 13, which is formed with the natural fiber or chemical fiber threads 3 and the flat threads 1 and is provided with a coating, so that an air layer can be formed in the life jacket 58.

With the life jacket 58 thus configured, the flat threads 1 that constitute a part of the life jacket 58 reflect the incident light from various light sources, and therefore, lifesaving operations at night can be quickly made, and more safety on the sea can be provided.

Figure 26:
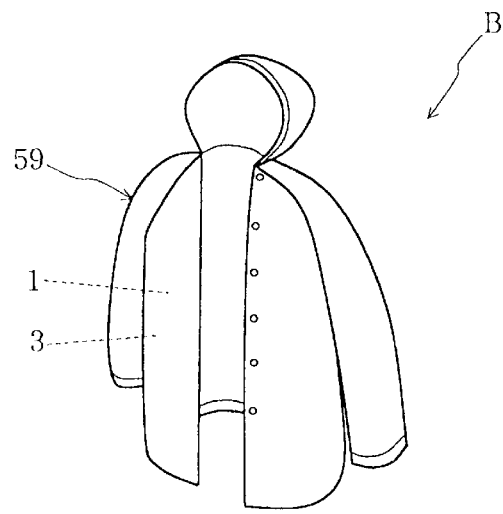
FIG. 26 is a bird's eye view of a rain coat configured from a reflective implement provided by using a fiber product having reflective threads according to this invention.

FIG. 26 is a bird's eye view of a rain coat 59 which is configured from a reflective implement B provided by using the fiber product A having reflective threads according to this invention.

The rain coat 59 is formed with the woven fabric 4 or the Jacquard woven fabric 6, which is formed with the natural fiber or chemical fiber threads 3 and the flat threads 1 and provided with a coating.

With the rain coat 59 thus configured, the flat threads 1 that constitute a part of the rain coat 59 reflect the incident light from various light sources, and therefore, a unique and novel rain coat which reflects light at night can be realized, and when used at night, it can provide the user with more safety.

Figure 27:
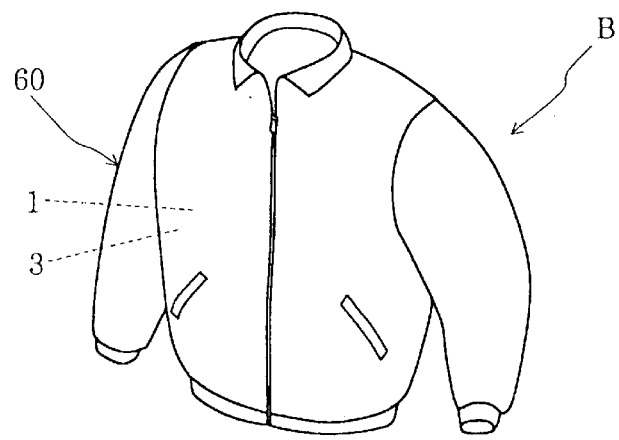
FIG. 27 is a bird's eye view of sports clothing configured from a reflective implement provided by using a fiber product having reflective threads according to this invention.

FIG. 27 is a bird's eye view of a sports suit 60, that is configured from a reflective implement B provided by using the fiber product A having reflective threads according to this invention.

Various types of suits of clothes such as the suit 60 can be formed with the woven fabric 4, the Jacquard woven fabric 6, the knitted fabric 12 or the knitted lace 13, which is formed with the natural fiber or chemical fiber threads 3 and the flat threads 1.

With the various types of suits of clothes 60 thus configured, the flat threads 1 that constitute a part of the various types of suits of clothes 60 reflect the incident light from various light sources, and therefore, unique and novel, suits of clothes 60 which reflect light at night can be realized, and when used at night, they can provide the user with more safety.

Figure 28:
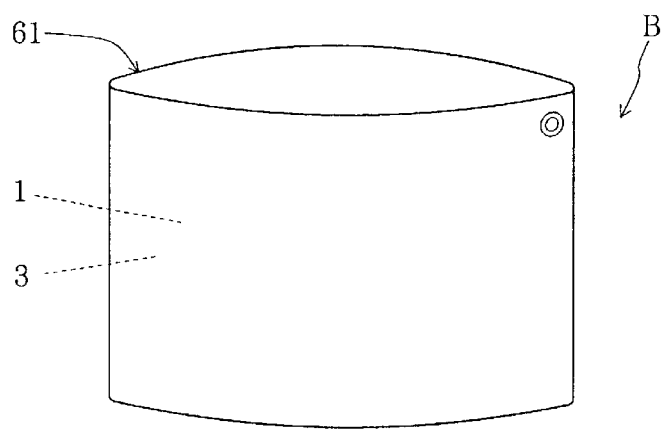
FIG. 28 is a bird's eye view of an arm band configured from a reflective implement provided by using a fiber product having reflective threads according to this invention.

FIG. 28 is a bird's eye view of an arm band 61 which is configured from a reflective implement B provided by using the fiber product A having reflective threads according to this invention.

The arm band 61 is formed with the woven fabric 4, the Jacquard woven fabric 6, the knitted fabric 12 or the knitted lace 13, which is formed with the natural fiber or chemical fiber threads 3 and the flat threads 1.

With the arm band 61 thus configured, the flat threads 1 that constitute a part of the arm band 61 reflect the incident light from various light sources, and therefore, a unique and novel arm band which reflects light at night can be realized, and when used at night, it can provide the user with more safety.

Figure 29A:
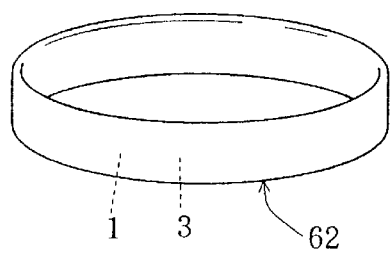
FIGS. 29(a) and 29(b) are bird's eye views of a hair band and a wrist band configured from reflective implements provided by using a fiber product having reflective threads according to this invention.
Figure 29B:
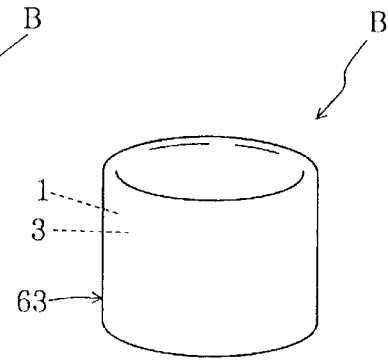
Figure 31:
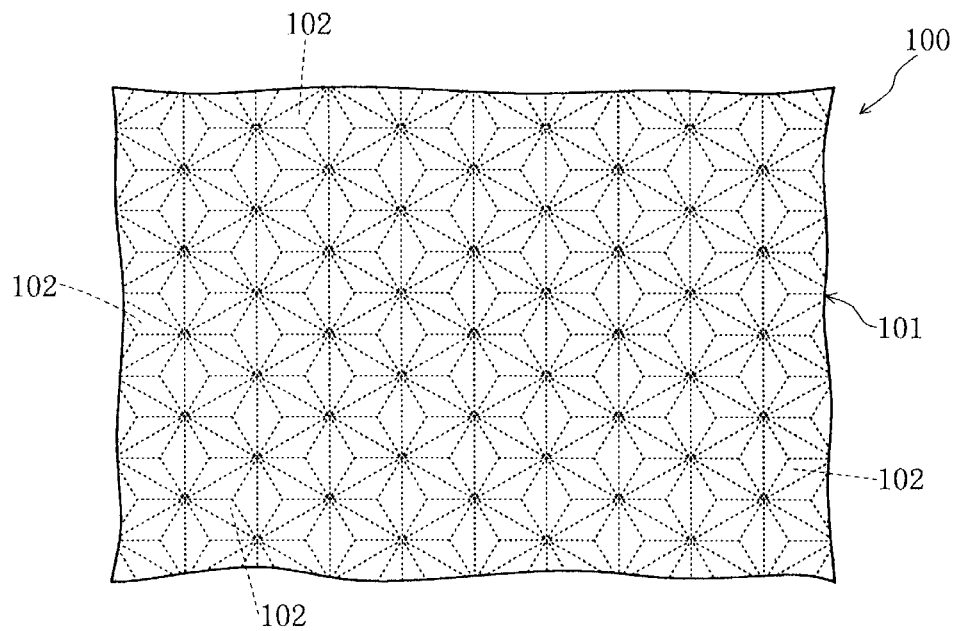
FIG. 31 is an enlarged drawing of a conventional sheet-like light returning reflective product.
Figure 32:
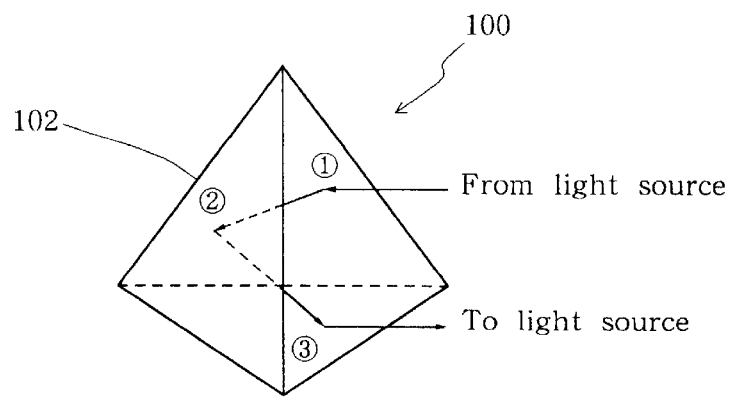
FIG. 32 is an enlarged bird's eye view of a part of the conventional reflective product shown in FIG. 31.

FIGS. 29(a) and 29(b) are bird's eye views of a hair band 62 and a wrist band 63 is configured from reflective implements B provided by using the fiber product A having reflective threads according to this invention.

The hair band 62 or the wrist band 63 is formed with the woven fabric 4, the Jacquard woven fabric 6, the knitted fabric 12 or the knitted lace 13, which is formed with the natural fiber or chemical fiber threads 3 and the flat threads 1 and incorporate a stretchable material such as rubber. This preferred embodiment provides a hair band 62 or a wrist band 63. However, with this invention, other various types of bands can, of course, be realized.

With the hair band 62 or the wrist band 63 thus configured, the flat threads 1 that constitute a part of the hair band 62 or the wrist band 63 reflect the incident light from various light sources, and therefore, a unique and novel hair band or wrist band which reflects light at night can be realized.

FIG. 30 is a plan view of an umbrella ferrule cap 64 which is configured from a reflective implement B provided by using the fiber product A having reflective threads according to this invention.

With the umbrella ferrule cap 64, the braided string 7, which is formed with the natural fiber or chemical fiber threads 3 and the flat threads 1, is used to form a small-sized cylinder 65 so that the cylinder 65 can be loaded on the ferrule of an umbrella.

With the umbrella ferrule cap 64 thus configured, the flat threads 1 that constitute a part of the umbrella ferrule cap 64, reflect the incident light from various light sources, and therefore, a unique and novel umbrella whose ferrule reflects light at night can be realized, and when used at night, it can provide the user with more safety.

This invention is not limited to the above-stated embodiments, and variants of the above-stated embodiments are to be embodied within the scope of the claims.

This invention described above in detail provides the following effects:

With the fiber products described above, it is possible to offer fiber products of the woven fabric, the narrow-width woven fabric, the Jacquard woven fabric, the braided string, the knitted string, the twisted string, the crosswise wound thread, the crosswise wound string, the knitted fabric and the knitted lace in which flat threads, which are made of polyester or other material, are used as a material. Triangular pyramid-like or otherwise shaped micro-prisms are formed consecutively and regularly on the material. The flat thread itself reflects the incident light from the light source three times at the surfaces of said micro-prism so that the reflected light is reflected back in a direction opposite to the direction of incidence. The products provided with the flat threads thus configured and natural or chemical threads can be used for forming a wide variety of reflective implements as well as reflecting the light from various light sources.

With the reflective implements described above, it is possible to offer the walking stick cover for the blind, the pet rope, the rope for use at night in a place such as a construction site, the implement for hanging a pair of spectacles, the pair of spectacles, the forming implement for use in a variety of bags, the fastener loading tape, the button wrapping implement, the cap implement, the amulet case, the cover for traffic safety sign carrier, the implement for wrapping a fishing float, the implement for wrapping a ring buoy, the life jacket, the rain coat, the suit of clothes, the arm band, the hair band, the wrist band, and the umbrella ferrule cap which are unique and novel, and which reflect light at night to provide more safety for the user.

What is claimed is:

1. A reflective fiber product comprising:

reflective flat threads;

natural fiber or synthetic fiber threads interengaged with said reflective flat threads;

wherein each of said reflective flat threads comprises a plurality of consecutively disposed light-reflecting micro-prisms; and wherein each of said light-reflecting micro-prisms constitutes a means for reflecting incident light three times at surfaces thereof such that reflected light is reflected back in a direction opposite to a direction of said incident light.

2. A reflective fiber product as recited in claim 1, wherein each of said reflective flat threads is 100 percent polyester.

3. A reflective fiber product as recited in claim 1, wherein said natural fiber or synthetic fiber threads are woven together with said reflective flat threads to form a woven fabric; and said reflective flat threads are spaced apart at regular intervals and constitute warps and fillers of said woven fabric.

4. A reflective fiber product as recited in claim 1, wherein said natural fiber or synthetic fiber threads are woven together with said reflective flat threads to form a woven fabric strip; and said reflective flat threads are spaced apart at regular intervals and constitute warps and fillers of said woven fabric strip.

5. A reflective fiber product as recited in claim 1, wherein said natural fiber or synthetic fiber threads are woven together with said reflective flat threads to form a jacquard woven fabric; and said reflective flat threads are spaced apart at regular intervals and constitute warps and fillers of said jacquard woven fabric.

6. A reflective fiber product as recited in claim 1, wherein said natural fiber or synthetic fiber threads are braided together with said reflective flat threads to form a braided string.

7. A reflective fiber product as recited in claim 1, wherein said natural fiber or synthetic fiber threads are knitted together with said reflective flat threads to form a knitted string.

8. A reflective fiber product as recited in claim 1, wherein said natural fiber or synthetic fiber threads are twisted together with said reflective flat threads to form a twisted string.

9. A reflective fiber product as recited in claim 1, wherein said natural fiber or synthetic fiber threads are wound crosswise together with said reflective flat threads to form a crosswise wound thread.

10. A reflective fiber product as recited in claim 9, wherein said natural fiber or synthetic fiber threads and said reflective flat threads are wound about a core.

11. A reflective fiber product as recited in claim 1, wherein said natural fiber or synthetic fiber threads are wound crosswise together with said reflective flat threads to form a crosswise wound string.

12. A reflective fiber product as recited in claim 11, wherein said natural fiber or synthetic fiber threads and said reflective flat threads are wound about a string.

13. A reflective fiber product as recited in claim 1, wherein said natural fiber or synthetic fiber threads are knitted together with said reflective flat threads to form a knitted fabric.

14. A reflective fiber product as recited in claim 1, wherein said natural fiber or synthetic fiber threads are knitted together with said reflective flat threads to form a knitted lace.

* * * * *